US009699220B2

(12) United States Patent
Coulas et al.

(10) Patent No.: US 9,699,220 B2
(45) Date of Patent: Jul. 4, 2017

(54) SYSTEM AND METHOD TO PROVIDE COMBINATIONAL SERVICES TO ANONYMOUS CALLERS

(75) Inventors: Michael F. Coulas, Buffalo Grove, IL (US); Apostolis K. Salkintzis, Athens (GR)

(73) Assignee: Google Technology Holdings LLC, Mountain View, CA (US)

( * ) Notice: Subject to any disclaimer, the term of this patent is extended or adjusted under 35 U.S.C. 154(b) by 1166 days.

(21) Appl. No.: 11/617,021

(22) Filed: Dec. 28, 2006

(65) Prior Publication Data

US 2008/0090556 A1 Apr. 17, 2008

(30) Foreign Application Priority Data

Oct. 16, 2006 (EP) .................................. 06386029

(51) Int. Cl.
*H04L 29/06* (2006.01)
*H04M 7/00* (2006.01)

(52) U.S. Cl.
CPC ...... *H04L 65/1016* (2013.01); *H04L 65/1069* (2013.01); *H04L 65/4007* (2013.01); *H04M 7/0024* (2013.01); *H04M 7/0027* (2013.01); *H04M 7/0075* (2013.01)

(58) Field of Classification Search
CPC ............. H04L 65/1016; H04L 65/4007; H04L 65/1069; H04M 7/0024; H04M 7/0027; H04M 7/0075
USPC .......................................... 455/412.1, 414.1
See application file for complete search history.

(56) References Cited

U.S. PATENT DOCUMENTS

| | | |
|---|---|---|
| 2002/0118809 A1 | 8/2002 | Eisenberg |
| 2003/0086410 A1* | 5/2003 | Eikkula ......................... 370/352 |
| 2003/0112928 A1* | 6/2003 | Brown ............... H04M 3/2218 379/67.1 |
| 2004/0249887 A1* | 12/2004 | Garcia-Martin et al. ..... 709/204 |
| 2005/0143053 A1* | 6/2005 | Virtanen et al. ........... 455/414.1 |
| 2005/0152528 A1* | 7/2005 | Newman et al. ............. 379/229 |
| 2005/0195762 A1* | 9/2005 | Longoni et al. .............. 370/328 |
| 2005/0201370 A1* | 9/2005 | Poyhonen et al. ........... 370/389 |
| 2005/0213537 A1* | 9/2005 | Ingimundarson et al. ... 370/329 |
| 2007/0105569 A1* | 5/2007 | Brass et al. ................... 455/466 |
| 2007/0165612 A1 | 7/2007 | Buckley |

OTHER PUBLICATIONS

Motorola, "CSI Origination Towards Public Service Numbers, S2-063790", 3GPP TSG SA WG2-55 [Online] XP002494102, Oct. 23, 2006, pp. 1-2.
3GPP SA WG2, 3rd Generation Partnership Project: Technical Specification Group Services and System Aspects; Combining Circuit Switched (CS) and IP Multimedia Subsystem (IMS) Services XP002452202; Dec. 11, 2006 pp. 1-35, 3GPP TS 23.279 V7.5.
Korean Intellectual Property Office, "Notice of Preliminary Rejection" Nov. 25, 2010, pp. 1-4, Korean Patent Application No. 10-2009-7013285.

* cited by examiner

*Primary Examiner* — Joseph Dean, Jr.
(74) *Attorney, Agent, or Firm* — Faegre Baker Daniels LLP

(57) ABSTRACT

A system and method in which a notification is received of a call from a first device to a second device in a first domain. A context is created for the first type of call. A notification is received of initiation of a call from the second device to the first device in a second domain. The call context is utilized to notify the first device of the initiation of the call from the second device to the first device.

11 Claims, 5 Drawing Sheets

SYSTEM AND METHOD TO PROVIDE COMBINATIONAL SERVICES TO ANONYMOUS CALLERS

BACKGROUND

Consumers today utilize a large number of mobile communications services. Such services include, but are not limited to, traditional voice services, video sharing, file sharing, multimedia messaging, instant messaging, white board, and the like.

Quite often, consumers want to utilize two or more services at the same time. Two parties might want to have a voice call while viewing a shared video or collaborating on a shared document. Consumers also want to be able to move easily between services. For instance, two parties having a traditional voice call might want to change the call to a video call. Too often, however, the present state of technology renders such exchanges impossible.

For example, one party might not know the identity of another party because of the invocation Calling Line Identification Restriction (CLIR) during the establishment of a CS voice call. If this occurs, the called party will not know the identity of the calling party. The called party will not be able to invoke an IMS session with the calling party because the called party will not be able to send an invite message to the calling party. In another instance, a user might call a road assistance service by placing a normal CS call to a service number. The road assistance service then dynamically selects an available terminal (agent) to terminate the CS call. If the user wants to establish an IMS session (say a Video-Sharing or White-Boarding session) with the road assistance representative, the user will attempt to initiate an IMS session with the road assistance service (e.g. <sip:1154@operator.com>). However, because the user does not know the identity of the operator's exact terminal, the IMS service will not be established. In another instance, a user might want to handoff a CS call to an IMS network, but if the user does not know the other party's identity such a handoff will not be possible. Accordingly, what is needed is an approach by which services in a first domain are coupled to services in a second domain.

BRIEF DESCRIPTION OF THE DRAWINGS

For the purpose of facilitating an understanding of the subject matter sought to be protected, there are illustrative embodiments in the accompanying drawing, from an inspection of which, when considered in connection with the following description and claims, the subject matter sought to be protected, its construction and operation, and many of its advantages should be readily understood and appreciated

DETAILED DESCRIPTION

In one example, a method is provided. A request is received from a device in a second domain when a call is established in a first domain. An establishment of a call is detected in the first domain. A notification is sent to the device in the second domain when the call is established in the first domain.

In other example, a system is provided. An interface component receives a request of a subscription from a device in a second domain to notify the device when a call is established in a first domain. A processing component detects an establishment of the call in the first domain. A notification component that notifies the device when the call is established.

Figure 1:
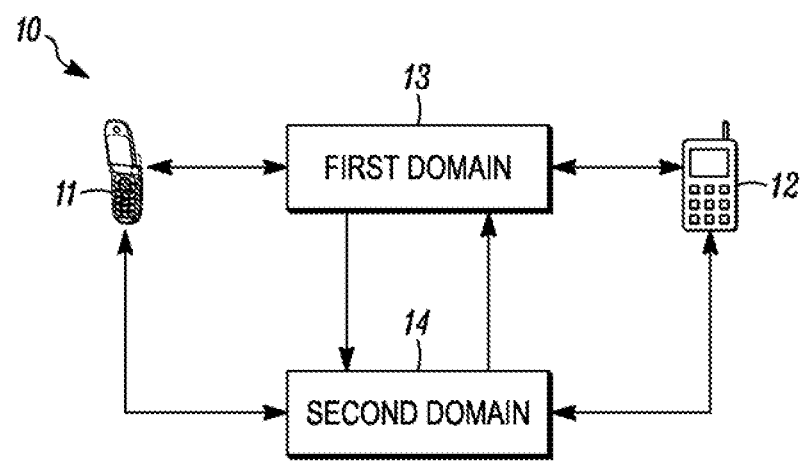
FIG. 1 depicts an exemplary embodiment of a system including a first device and a second device that are capable of a data exchange in both a first domain and a second domain.

Referring to FIG. 1, a system 10 in one example comprises a first device 11, a second device 12, a first domain 13, and a second domain 14.

Devices 11, 12 in one example are any suitable devices operative to send and/receive data in accordance with the operation of a wireless communication system. Examples of devices 11, 12 include, but are not limited to, cellular phones, mobile phones, pagers, radios, personal digital assistants (PDAs), mobile data terminals, laptop computers, application specific gaming devices, video gaming devices incorporating wireless modems, and combinations or sub-combinations of these devices. Such devices generally include components such as processors, controllers, memory components, user interface devices, data transmission logic, networks interfaces, antennas, and the like. The design and operation of these devices is well known so a detailed description of each possibility will be omitted.

Domains 13, 14 each refer to an environment in which at least one service is provided. Each domain 13, 14 could be comprised of one or more networks. Such networks, include, but are not limited to GSM, GPRS, CDMA, IDEN, 2.5G, 3G, and WiMAX (802.16e), networks. In addition domains 13, 14 could be part of the same network.

For the purposes of this disclosure, each domain 13, 14 will be described as providing at least one service that is distinct from the other domain. For example, domain 13 could be a circuit switched (CS) network in which traditional CS voice service is provided and domain 14 could be an IP Multimedia Subsystem (IMS) network in which services, such as video sharing and white boarding, are provided. Domain 13 could be comprised of a plurality of networks that provide CS voice service, and domain 14 could be comprised of a plurality of networks that provide IMS service. In addition domains 13, 14 could be part of a single network, such as a GSM network, which supports both CS services and IMS services (i.e. domain 13 is a CS domain within a GSM network and domain 14 is an IMS domain within the same GSM network).

Figure 2:
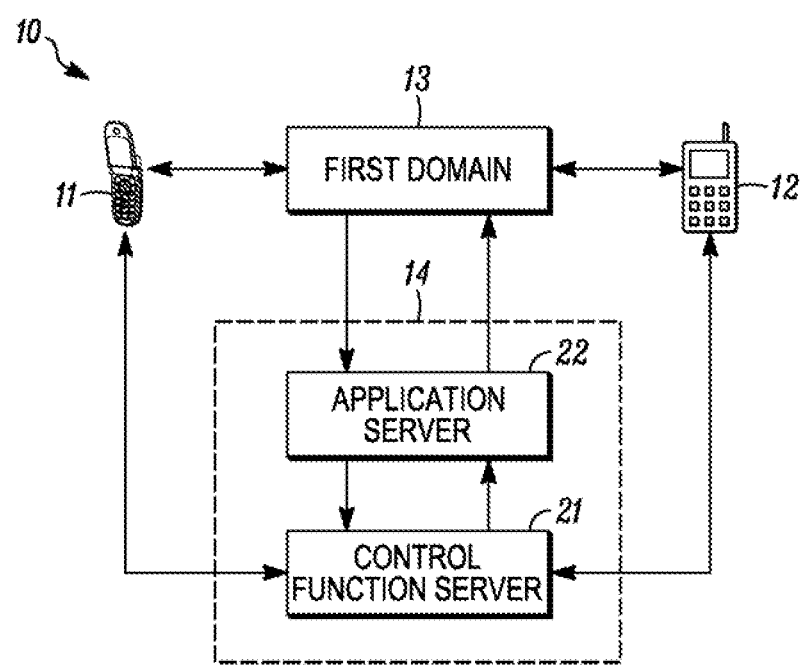
FIG. 2 shows the system in FIG. 1 with the second domain shown in greater detail.

Referring to FIG. 2, a more detailed, yet exemplary, description of system 10 will now be provided for illustrative purposes. Once again, for illustrative purposes domain 13 will be referred to as a CS domain and domain 14 will be referred to as an IMS domain. However, such a description should not be construed as limiting the present application to this embodiment.

Referring further to FIG. 2, IMS domain 14 includes an application server 21 and a control function server 22. In one example, application server 21 is a Circuit Switched Identity Application Server (CSI-AS) and control function server 22 is a Serving-Call Session Control Function (S-CSCF) server.

As will be further discussed herein, CSI-AS 21 receives notifications, from the CS domain 13, of voice calls involving device 12 and creates contexts for the calls that allow device 12 to invoke services in the IMS domain 14 that are closely coupled with voice calls in the CS domain 13.

In one example, S-CSCF server 22 is a session initiation protocol (SIP) server. S-CSCF provides control for users of IMS domain 14. It interacts with the network on behalf of the user and is allocated to the user during the SIP registration process.

Application server 21 and control function server 22, in one example, are formed of one or more computer software and/or hardware logic components. A number of such components can be combined or divided. In one example, an exemplary component of each device employs and/or comprises a series of computer instructions written in or implemented with any of a number of programming languages, as will be appreciated by those skilled in the art.

Figure 3:
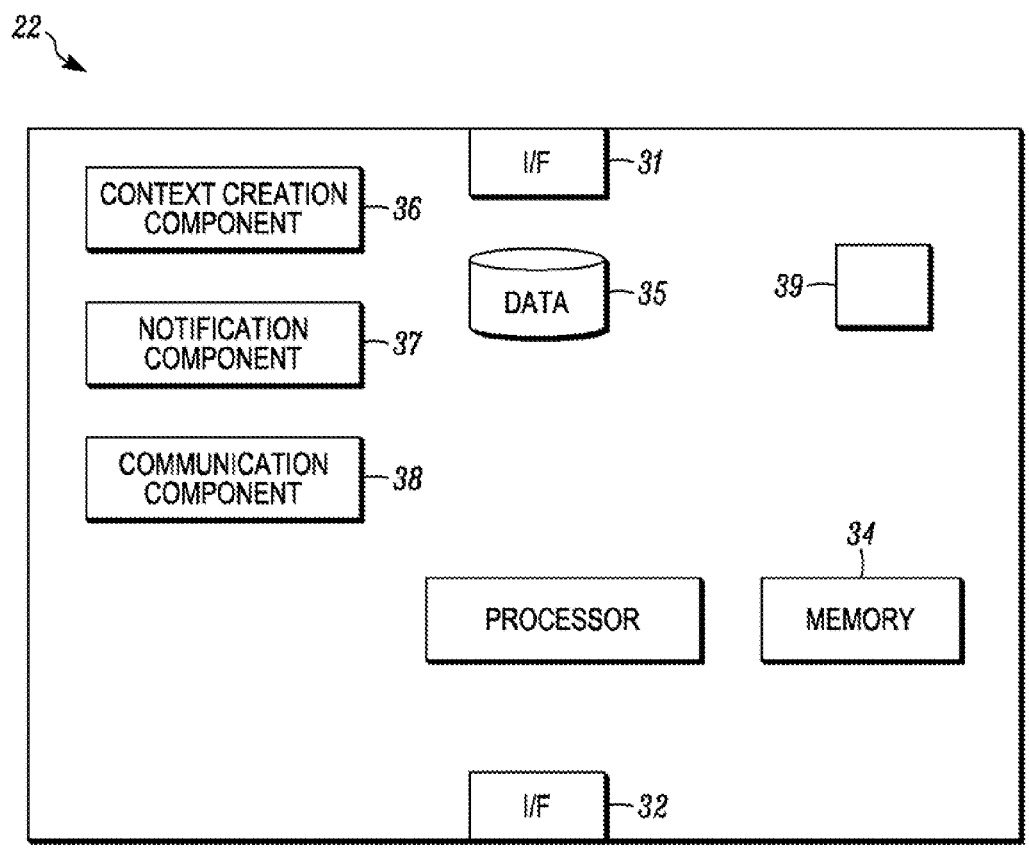
FIG. 3 is an exemplary functional block diagram of the application server of FIG. 2.

Referring to FIG. 3, exemplary components of CSI-AS 21, include interface components 31, 32, one or more instances of processor component 33, one or more instances of memory component 34, data structure 35, context creation component 36, notification component 37, and call reference communication component 38.

Interface component 31 in one example is utilized by CSI-AS 21 to send data to/from the first domain 13. Interface component 32 in one example is utilized to send data to/from S-CSCF 22. Processor component 33 governs and carries out the functionality of the CSI-AS 21 by executing code embodied in hardware and/or software. Memory component 34 provides storage in which data, instructions, software routines, code sets, databases, etc. can be stored. Data structure 35 in one example is utilized to store call context information generated when devices 11, 12 engage in calls in the CS domain 13. Data structure 35 may be stored in memory 34 or may be a standalone element. Context creation component 36 is utilized to create a call context when device 11 makes a CS call to device 12. Notification component 37 is utilized to notify device 11 when device 12 makes a call to device 11 through the second domain 14. Call reference communication component 38 is utilized to send a call reference to device 12 after a call context is created. Context creation component 36, notification component 37, and call reference communication component 38 in one example are executed on processor 33 and can be stored in memory 34, or elsewhere.

For instance, in one example, system 10 includes at least one computer-readable signal-bearing medium 39. An example of a computer-readable signal-bearing medium 39 is a recordable data storage medium such as a magnetic, optical, and/or atomic scale data storage medium. In another example, a computer-readable signal-bearing medium 39 is a modulated carrier signal transmitted over a network coupled to CSI-AS 21. A computer-readable signal-bearing medium 39 can store software logic components that are employable to carry out the functionality described herein.

Figure 4:
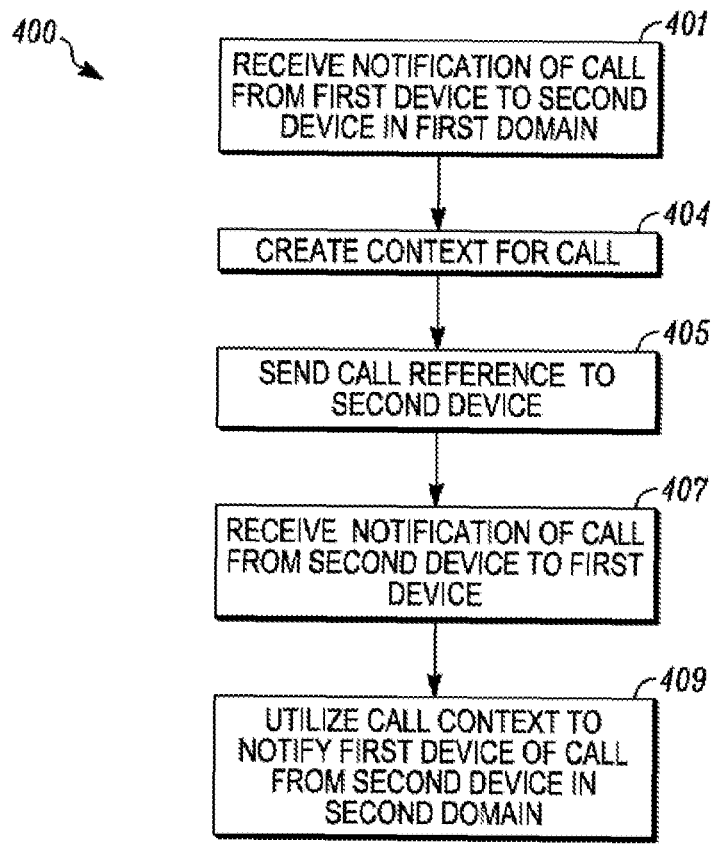
FIG. 4 is a flowchart describing exemplary operation of the system of FIG. 1.

Referring to FIG. 4, an exemplary method 400 of operation of system 10 will now be described for exemplary purposes.

In step 401, CSI-AS 21 receives a notification from CS domain 13 that device 11 has placed a CS call to device 12 in the first domain 13. In one example, the CS domain 13 is a GSM network. The GSM CC call setup signaling at the terminating MSC (the one serving device 12 but not shown) triggers a Customized Applications for Mobile network Enhanced Logic (CAMEL) initial DP message towards the GSM Service Control Function (gsmSCF) of the CSI-AS 21. In turn, the gsmSCF sends a CAMEL response directing the MSC to continue the call setup.

Figure 5:
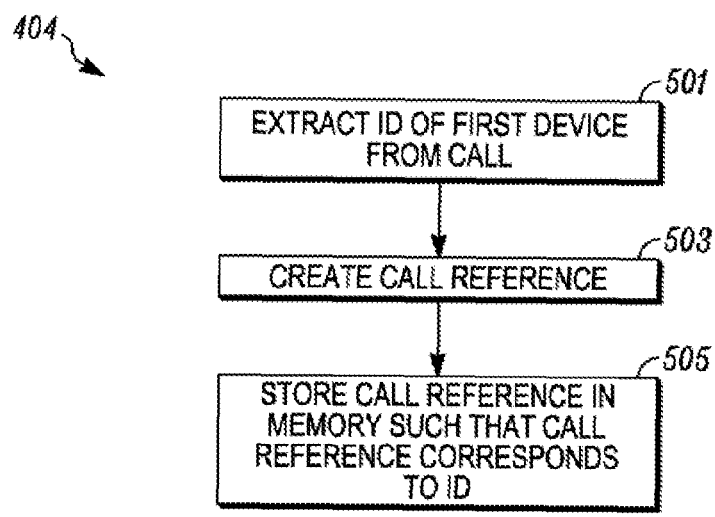
FIG. 5 is a flowchart providing an exemplary description of call context creation in the system of FIG. 1.

In response to the CAMEL signaling, CSI-AS 21 creates a context for the CS call in step 403. Referring to FIG. 5, in step 501, CSI-AS 21 extracts the ID of the first device 11 from the notification received from first domain 13. In one example, this is caller identification (CLID) information from the CS call from the first device 11 to the second device. It should be noted that if device 11 invoked CLIR, the CLID information will not be available to device 12. Yet, the CLID information will be available to the network of the first domain 13. Accordingly, terminating MSC will provide the CLID information to the CSI-AS 21.

In step 503, the CSI-AS 21 creates a call reference. In one example, the call reference is generated by the CSI-AS 21 utilizing a Universally Unique IDentifier (UUID) Uniform Resource Name (URN), as specified in Request for Comments (RFC) 4122, which is hereby incorporated by reference. The UUID URN allows for non-centralized computation of a URN based on time, unique names, or a random number generator and guarantees uniqueness across space and time. An exemplary call reference is: urn:uuid:f81d4fae-7dec-11d0-a765-00a0c91e6bf6.

The call context is not limited to a call reference and an identifier. Additional information could be added to the call context. For example, the call information, such as calling and called party phone numbers, a redirecting party phone number, CLIR invocation status, information contained in User-user IEs, and any other important information contained in CC signaling messages. This additional information could be obtained by the CSI-AS 21 through CAMEL signaling. It may also be possible for the CSI-AS 21 to obtain additional information from other IMS Applications Servers that store CS call information, such as the Voice Call Continuity (VCC) AS, for example.

Referring further to step 505, the call context in one example is stored in data structure 35 such that the call reference corresponds to the identifier for the first device 11. For instance, the call reference and identifier could be stored in a data table.

Referring now to FIG. 4, in step 405, the call reference is sent to the second device 12. Consequently, if device 12 wants to make invoke an IMS call to device 11, device 12 does not need to know the identity of device 11. Rather device 12 can initiate an IMS call through CSI-AS 21 which has cross-referenced the identity of device 11 with the call reference.

CSI-AS 21 can implement step 405 in a number of ways. In one example, the CSI-AS 21 initiates an Unstructured Supplementary Service Data (USSD) session with device 12 and sends the call reference within the session. In another example, the CSI-AS 21 sends the call reference to the second device 12 in a short message service (SMS) message. In a further example, the second device 12 requests the call reference from the CSI-AS 21 over the internet via a web interface (e.g. a WAP interface). In still a further example, a SIP event package can be utilized such that the second device 12 receives a SIP NOTIFY message from the CSI-AS that includes the call reference. A more detailed discussion of the SIP event package will be discussed further herein.

Referring further to FIG. 4, as another alternative, rather than send the call reference to the second device 12, the second device 12 and CSI-AS 21 could each generate a call reference using the same set of rules. For instance, the call reference could contain the following information: (1) The mobile identity (e.g., TMSI or IMSI) currently in use by called party when it accepted the call (e.g., in PAGING REQUEST); and (2) the DTAP CC Transaction ID (TI) generated by the network and included in CC Setup request sent to called party (identifies the specific CS call for the mobile).

Continuing to refer to FIG. 4, in step 407, the CSI-AS 21 receives a notification that the second device 12 wants to initiate an IMS call the first device 11.

In one example, device 12 sends the request to the CSI-AS 21 by addressing a SIP request to the call reference of the CS call. Such a SIP request can be generated by using a SIP URI (e.g., SIP:combinational.operator.com) with a "callref=<callreference>" parameter to identify the call reference. (e.g. SIP:combinational.operator.com;callref=<callreference>). The S-CSCF 22 in the IMS domain 14 applies Initial Filter Criteria (iFC) for P-Asserted-Identity to the SIP request and upon matching the SIP URI, forwards the SIP request to the CSI-AS 21. CSI-AS 21 then keys on <callreference> and re-targets the request to the device 11 telnum.

In another example, the second device 12 addresses a request to the PSI of CSI-AS 21 with a "callref=<callreference>" parameter to identify the call reference and either a "combinational" or "remote-party" parameter to indicate that the remote party of the CS call is being addressed. For example, SIP:<CSI_AS_PSI>.operator.com;
  callref=<callreference>;combinational or
SIP:<CSI_AS_PSI>.operator.com;
  callref=<callreference>;remote-party In this case, the SIP Request is routed directly to the CSI-AS 21 (there is no need for iFC). CSI-AS 21 then keys on <callreference> and re-targets the request to the device 11 telnum. An AS PSI must be provisioned on the terminal.

In another example, the call reference is embedded in a wild-carded PSI managed by the CSI-AS 21. The request is then addressed to the wild-carded PSI with a "combinational" or "remote-party" parameter to indicate that the remote party of the CS call is being addressed. For example:

SIP:<CALL_REF_PSI>.operator.com;combinational or
SIP:<CALL_REF_PSI>.operator.com;remote-party In this case, the SIP Request is routed directly to CSI-AS 21 where the wild-carded PSI is managed. CSI-AS then keys on the CS call referenced by the wild-carded PSI and re-targets the request to the device 11 telnum.

Finally, it should be noted that the CSI-AS 21 deletes the call when the parties end the CS call and the CS domain 13 releases the CS call. For example, in a GSM network, GSM CC call release signaling at the terminating MSC initiates CAMEL signaling towards the gsmSCF function of the CSI-AS 21 In response to the CAMEL signaling, the CSI-AS 21 deletes the context for the CS call in.

Figure 6:
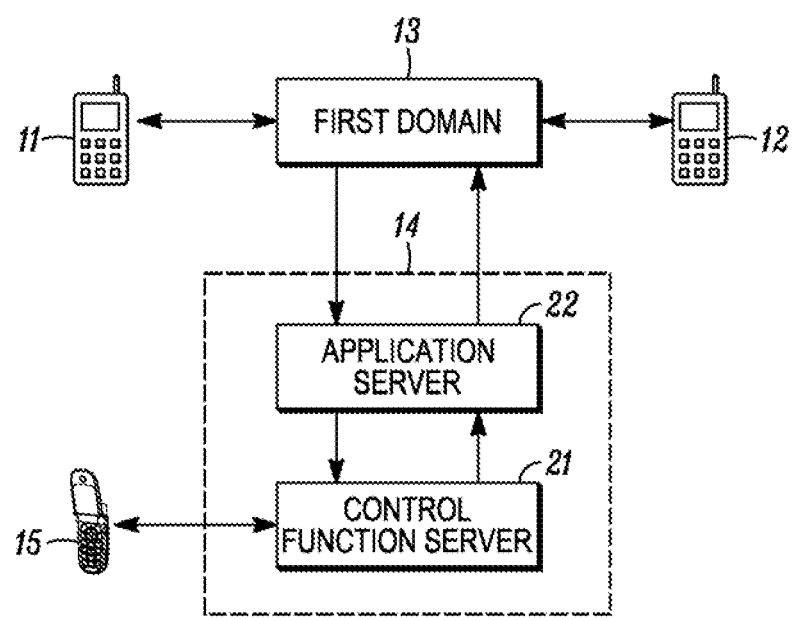
FIG. 6 depicts another exemplary embodiment of the system of FIG. 1.

Referring to FIG. 6, a SIP event package will now be described herein. Another embodiment of system 10, is shown in which one or more IMS devices 15 can subscribe to a SIP events package, which will notify the IMS devices 15 when one or more CS devices engage in a call. System 10 is shown in FIG. 6, as including IMS device 15, in addition to first device 11 and second device 12. Once again, domain 13 is described as a CS domain and domain 14 is described as an IMS domain. However, the present application should be construed as limited to this embodiment.

First device 11 and second device 12 are shown as connected to the CS domain and device 15 is shown as an IMS device connected to IMS domain 14. It should be noted that this arrangement is provided for illustrative purposes only. Different combinations and sub-combinations of devices 11, 12, and 15 are envisioned. For example, devices 11, 12 could each include IMS capability and device 15 could include CS capability. Accordingly, the SIP event package describe hereafter to devices 11, 12. However, for the sake of clarity, the SIP events package will be described with respect to device 15. Furthermore, it should be noted the users of first domain 13 and second domain 14 could each have multiple IMS devices, which subscribe to the SIP event package described herein, for one or more CS devices owned, but for the sake of brevity, only devices 11, 12, and 15 are shown.

The SIP event package in one example is a CS Calling Services Event Package to which a user of an IMS device (e.g. device 15) can subscribe. By subscribing to the SIP Calling Service Event Package (referred to hereinafter as "the SIP package"), the user of device 15 can tell the second domain CSI-AS 21 to notify device 15 when specific services are initiated in the first domain 13. For example, device 15 can request that CSI-AS 21 notify device 15 when a CS voice call is terminated to a particular device (e.g. device 11 or device 12). CSI-AS 21 will then identify and maintain information about the CS call and provide CS call information to the user of device 15.

It should be noted that if device 15 and device of interest in the CS domain (e.g. device 11 or device) or owned by the same user, then subscribing to the SIP package is straightforward from a security standpoint. Similarly, if the device of interest and device 15 were the same device (e.g. a mobile unit with CS and IMS capability), then subscribing to the SIP package would be straightforward from a security perspective. However, if the device of interest and device 15 were separate devices and owned by separate users, then from a security standpoint, it would be worthwhile to provide a mechanism to verify that device 15 is authorized to subscribe to CS call information relating to the device of interest. For example, a password could be required for a subscription to take effect, or the owner of the device in question might have to provide the system with an explicit authorization to allow device 15 to subscribe, or the owner of the device could have an option to turn security settings on or off, and so on.

The SIP package provides a concrete application of the SIP events framework specified in RFC 3265, which is hereby incorporated by reference, and defines the events and information relating to a user's CS calls to which an IMS user may subscribe. The CS Calling Services event package can notify a subscriber of events, such as a CS call involving the subscriber being established (in this case, information about the call is also transferred, e.g. the call type originating, terminating, the call mode, the call reference in the CSI-AS, etc.); a CS involving the subscriber being released; a change of call state (e.g., call hold); and other CS related events (new CS call waiting, etc.) These notifications do not necessarily duplicate the information that is already conveyed to the subscriber over the CS domain, but rather convey to the subscriber extra information about these events that can be used in the IMS domain (e.g. a call reference). The subscriber may choose not to subscribe to all possible events. For example, the subscriber may choose to subscribe only to the "CS established" event (in which case he will not be notified when a call is released or its status is changed. This choice can be specified by including a filter document in the body of a SIP SUBSCRIBE request.

Examples of the use of SIP package on system 10 include, but are not limited to, the following: A single IMS subscriber might have multiple IMS-capable devices. Each device may obtain information about the CS calls established on CS devices and use this information to initiate IMS services related to those CS calls. A WLAN/VoIP device can request to receive a voice call currently active on a GSM device. A user can initiate an IMS video session with an anonymous device. A user can initiate combinational calls to call centers even if the terminal, to which the user is connected, is anonymous (see the road assistance center described above).

Referring further to FIG. 6, in one example, CSI-AS 21 identifies and maintains information in a manner similar to that of step 403 of method 400. For example, CSI-AS 21 creates a call context that contains a call reference and an identifier for first device. In addition to these elements, the call context could contain additional information, such as calling and called party phone numbers, a redirecting party phone number, CLIR invocation status, information contained in User-user IEs, and any other important information contained in CC signaling messages. In another example, the CSI-AS 21 could obtain additional information from other IMS Applications Servers that store CS call information, such as the Voice Call Continuity (VCC) AS.

In one example, when an originating or terminating CS call is being established with one of devices 11, 12, CAMEL procedures are invoked to route CS call control messages to the CSI-AS 21 which establishes and stores the call context. As with the system shown in FIG. 1, the same mechanism is used when a CS call is released. A CAMEL procedure is invoked by the CS domain's MSC to send a notification to CSI-AS 21. CSI-AS 21 then removes the CS call context.

Figure 7:
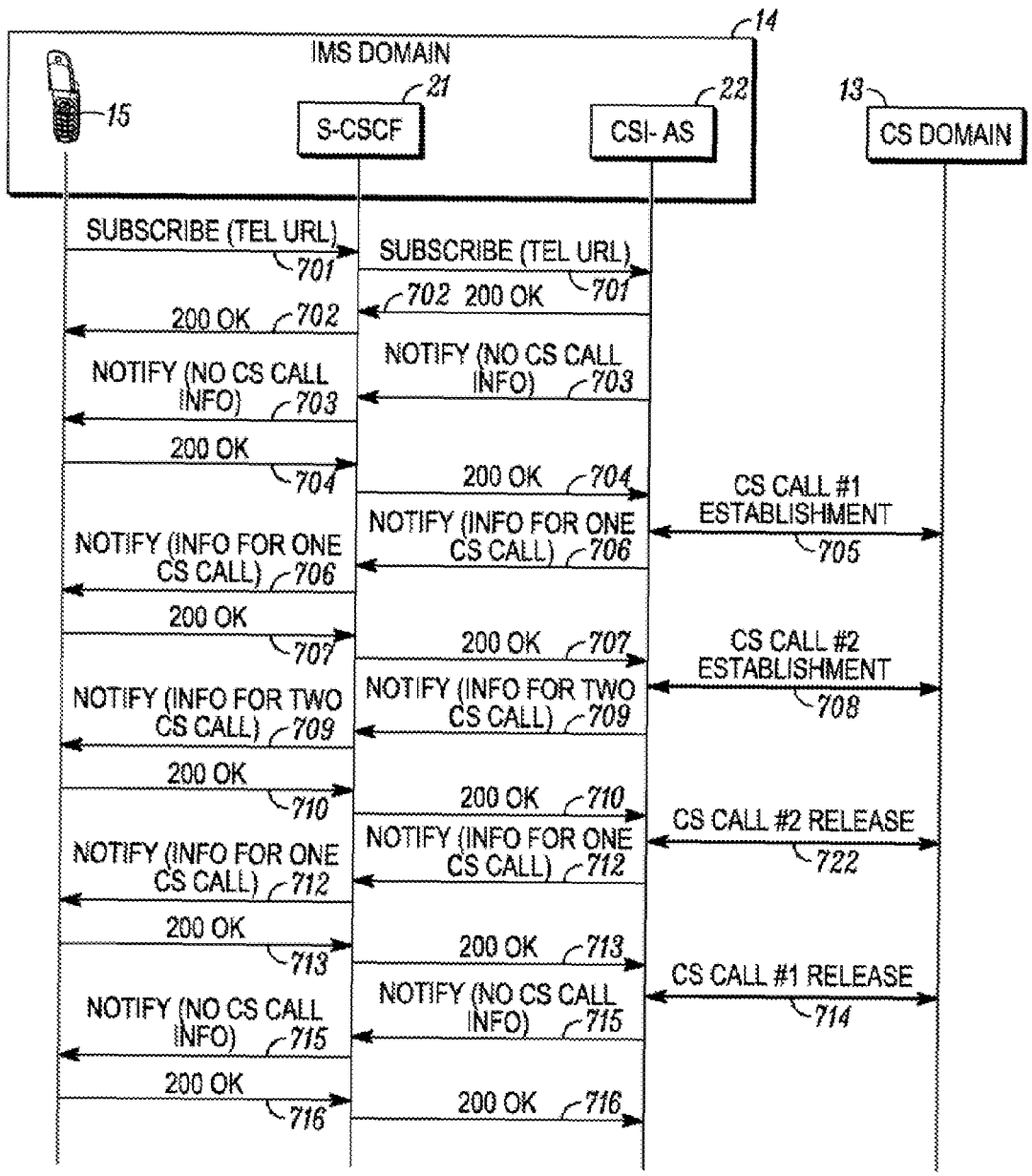
FIG. 7 is a signal diagram providing describing exemplary operation of the system of FIG. 6.

Referring now to FIG. 7, the SIP package will now be described in greater detail for illustrative purposes.

Device 15, in one example, is an IMS terminal. Device 15 subscribes to the SIP package by sending a SUBSCRIBE message 701 to CSI-AS 22 through S-CSCF 21. The subscription (SUBSCRIBE request) is serviced by the CSI-AS 21. After receiving the SUBSCRIBE request, CSI-AS 22 sends an OK response message 703 to device 15 through S-CSCF 21.

The SIP package enables CSI-AS 21 to provide the user of device 15 with information about ongoing CS calls with devices in the CS domain. The SIP package event notifications (i.e., SIP NOTIFY request) can provide various information for each CS call that the subscriber is connected to: A call reference uniquely identifying the call in the IMS network; the calling and called party phone numbers; a redirecting party phone number; CLIR invocation status; information contained in User-user IEs; other important information contained in CC signaling messages.

An exemplary description of the format of the event package is as follows:
Event Package Name: cs-calling-service
NOTIFY body: XML document
MIME media type name: application
MIME subtype name: cscallinfo+xml
SUBSCRIBE Request-URI: TEL URL or Tel URL in SIP URI format. Must be a registered IMPU.
SUBSCRIBE To header: Same as Request URI.
The SUBSCRIBE request is addressed to a registered TEL URL or TEL URL in SIP URI format (i.e., registered IMPU). Filter criteria associated with the TEL URL route the initial SUBSCRIBE request to the CSI-AS 21. The CSI-AS 21 uses the IMPU addressed in the Request-URI as a key to access the CS call contexts for that user.

In the case where a single IMS subscriber has multiple IMS-capable devices using the same telephone number IMPU, then subscriptions to SIP event package may be established from any one of those devices. This allows a user to obtain information about CS calls established on other devices and to potentially use this information to initiate IMS services related to those CS calls from a different device.

An exemplary subscribe request 701, for information related to a telephone number (35850482137) is now provided for illustrative purposes:

```
SUBSCRIBE tel:+35850482137 SIP/2.0
Via: SIP/2.0/UDP 192.0.2.3:1357;comp=sigcomp;
branch=z9hG4bKnashds7
Max-Forwards: 70
Route: <sip:pcscf1.visited1.net:7531;lr;comp=sigcomp>
Route: <sip:orig@scscf1.home1.net;lr>
P-Preferred-Identity: "Dr John" <tel:+35850482137>
P-Access-Network-Info: 3GPP-UTRAN-TDD; utran-cell-id-
3gpp=234151D0FCE11
Privacy: none
From: <tel:+35850482137>;tag=31415
To: <tel:+35850482137>
Call-ID: b89rjhnedlrfjflslj40a222
Require: sec-agree
Proxy-Require: sec-agree
CSeq: 61 SUBSCRIBE
Event: cs-calling-services
Expires: 3600
Accept: application/cscallinfo+xml
Security-Verify: ipsec-3gpp; q=0.1;
alg=hmac-sha-1-96; spi-c=98765432; spi-
s=87654321; port-c=8642; port-s=7531
Contact: <sip:192.0.2.3:1357;comp=sigcomp>
Content-Length: 0
```

Referring again to FIG. 7, periodically, CSI-AS 22 will send NOTIFY messages 703 through S-CSCF 21 to device 15 indicating that no CS call info has been generated. Device 15 will send OK acknowledgment messages 704 back to CSI-AS 21.

When a call is established on either device 11 or device 12 in the CS domain 13, the MSC of the CS domain 13 will send a CAMEL message 705 to CSI-AS 22 notifying it that a CS call has been established. CSI-AS 22 will send a NOTIFY message 706 thorough S-CSCF 21 to device 15. Device 15 will respond with OK acknowledgement messages 707.

If a second call is established on device 12 in the CS domain 13, the MSC of the CS domain 13 will send a CAMEL message 708 to CSI-AS 22 notifying it that a CS call has been established. CSI-AS 22 will send a NOTIFY message 709 thorough S-CSCF 21 to device 15. Device 15 will respond with OK acknowledgement messages 710.

An exemplary SIP message NOTIFY message 709 sent by the CSI-AS 22 to device 15 when a second CS call is established for an exemplary telephone number (35850482137) is shown for illustrative purposes.
NOTIFY sip:192.0.2.3:1357;comp=sigcomp SIP/2.0

```
Via: SIP/2.0/UDP
pcscf1.visited1.net:7531;comp=sigcomp;branch=z9hG4bK240f34.1,
    SIP/2.0/UDP scscf1.home1.net;branch=z9hG4bK332b23.1,
    SIP/2.0/UDP csi-as.home1.net;branch=z9hG4bK846ht53.1
Max-Forwards: 69
From: <tel:+35850482137>;tag=151170
To: <tel:+35850482137>;tag=31415
Call-ID: b89rjhnedlrfjflslj40a222
CSeq: 42 NOTIFY
```

```
Subscription-State: active;expires=1580
Event: cs-calling-services
Content-Type: application/cscallinfo+xml
Contact: <sip:csi-as.home1.net>
Content-Length (---)
<?xml version="1.0"?>
<cscallinfo .......
    <information relating to CS call #1>
    <information relating to CS call #2>
</cscallinfo>
```

If the second call is released, a CAMEL message 711 is sent from CS domain 13 to CSI-AS 22. CSI-AS 22 will send a NOTIFY message 712 thorough S-CSCF 21 to device 15. Device 15 will respond with OK acknowledgement messages 713.

If the first call is released, a CAMEL message 714 is sent from CS domain 13 to CSI-AS 22. CSI-AS 22 will send a NOTIFY message 715 thorough S-CSCF 21 to device 15. Device 15 will respond with OK acknowledgement messages 716.

Referring further FIG. 7, during the first or second CS call, the user of IMS device 15 user might use the information provided in the SIP package notifications to invoke IMS services that are tightly coupled to specific CS calls. These services may be targeted to the CS call itself or may be targeted to the remote party of the CS call. In order to support the targeting of IMS service invocations to specific CS calls identified in CS Calling Services event package notifications, a SIP URI parameter called "callref" is used. This parameter has the following syntax:

callref=<call reference>, where <call reference> is the call reference returned in the CS Calling Services. An exemplary call reference is:

callref=urn:uuid:f81 d4fae-7dec-11 d0-a765-00a0c91e6bf6.

As an alternative, the call reference could be embedded in a wild-carded PSI generated by the CSI-AS and provided to the IMS user in CS Calling Services event package notifications. In this case, instead of using the callref parameter, the SIP request would be addressed directly to the wild-carded PSI.

Examples illustrating the use of the CS Calling Event Package will now be provided for illustrative purposes.

A CS call with CLIR invoked is established and the called party wishes to initiate a combinational service but it cannot because the calling party telnum is unknown. Consequently it addresses a SIP request to the call reference indicating combinational service. In one example, the called party uses a SIP URI indicating access to stored CS call context (e.g., SIP:csi-service.operator.com) with a callref parameter to identify the Call reference and either a "combinational" or "remote-party" parameter to indicate that the remote party of the CS call is being addressed. Example:

SIP:csi-service.operator.com;callref=<callreference>; combinational or

SIP:csi-service.operator.com;callref=<callreference>;remote-party

The iFC for P-Asserted-Identity is applied to SIP request in originating IMS network (IMS network of called party) and upon matching the SIP URI, the SIP request is forwarded to the CSI-AS. CSI-AS then keys on <callreference> and re-targets the request to the calling party telnum.

In another example, the called party uses a SIP URI indicating combinational service (e.g., SIP:combinational.operator.com or SIP:remote-party.operator.com) with a callref parameter to identify the Call reference. Example:

SIP:combinational.operator.com;callref=<callreference>
or
SIP:remoteparty.operator.com;callref=<callreference>

The iFC for P-Asserted-Identity is applied to SIP request in originating IMS network (IMS network of called party) and upon matching the SIP URI, the SIP request is forwarded to the CSI-AS. CSI-AS 21 then keys on <callreference> and re-targets the request to the calling party telnum.

In another example, a request is addressed to PSI of CSI-AS 21 with a "callref=<callreference>" parameter to identify the Call reference and either a "combinational" or "remote-party" parameter to indicate that the remote party of the CS call is being addressed. Example:

SIP:<CSI_AS_PSI>.operator.com;
    callref=<callreference>;combinational or
SIP:<CSI_AS_PSI>.operator.com;
    callref=<callreference>;remote-party The CSI-AS 21 then keys on <callreference> and re-targets the request to the calling party telnum. A CSI-AS PSI must be provisioned on the terminal.

As an alternative to using the callref parameter, the IMS user may also address the IMS service invocation directly to a wild-carded PSI based on the call reference. This CALL_REF_PSI would be included in CS Calling Services event notifications to the user. The call reference is embedded in a wild-carded PSI managed by the CSI-AS 21. The request is then addressed to the wild-carded PSI with a "combinational" or "remote-party" parameter to indicate that the remote party of the CS call is being addressed. Example:

SIP:<CALL_REF_PSI>.operator.com;combinational or
SIP:<CALL_REF_PSI>.operator.com;remote-party In this case, the SIP Request is routed directly to the CSI-AS 21 where the wild-carded PSI is managed. CSI-AS 21 then keys on the CS call referenced by the wild-carded PSI and re-targets the request to the calling party telnum. Note that the combinational service can be initiated from a different device than the device hosting the CS call if both devices share the same registered TEL URL IMPU.

In another example, an IMS user with an established CS call decides to handoff the call to the IMS domain. Consequently it addresses a SIP request to the call reference indicating handoff. Several alternative approaches are proposed.

The user sends an SIP URI indicating access to stored CS call context (e.g., SIP:csi-service.operator.com) with a callref parameter to identify the Call reference and a "handoff" parameter to indicate that the CS call is to be handed off to IMS. Example:

SIP:csi-service.operator.com;callref=<callreference>;
handoff

The iFC for P-Asserted-Identity is applied to SIP request in originating SIP network and upon matching the SIP URI, the SIP request is forwarded to the CSI-AS 21. CSI-AS 21 then keys on <callreference> and the "handoff" parameter and re-routes the request to the VCC AS (i.e., CCCF/NeDS) (The VCC AS and the CSI-AS could be co-located. If not, then a mechanism for correlating CS call references across both servers would be required) where the handoff procedure is executed.

The user sends a SIP URI indicating VCC service (e.g., SIP:vcc.operator.com) with a callref parameter to identify the Call reference and a "handoff" parameter to indicate that the CS call is to be handed off to IMS. Example:

SIP:vcc.operator.com;callref=<callreference>;handoff

The iFC for P-Asserted-Identity is applied to SIP request in originating SIP network and upon matching the SIP URI, the SIP request is forwarded to the CSI-AS 21. The CSI-AS 21 then keys on <callreference> and re-routes the request to the VCC AS (i.e., CCCF/NeDS) where the handoff procedure is executed.

The user addresses a request to PSI of CSI-AS 21 with a "callref=<callreference>" parameter to identify the Call reference and a "handoff" parameter to indicate that the CS call is to be handed off to IMS. Example:

SIP:<CSI_AS_PSI>.operator.com; callref=<callreference>;handoff

The request is routed directly to CSI-AS 21, which then keys on <callreference> and re-routes the request to the VCC AS (i.e., CCCF/NeDS) where the handoff procedure is executed. A CSI-AS PSI must be provisioned on the terminal.

As an alternative to using the callref parameter, the IMS user may also address the IMS service invocation directly to a wild-carded PSI based on the call reference. This CALL_REF_PSI would be included in CS Calling Services event notifications to the user. The call reference is embedded in a wild-carded PSI managed by the CSI-AS. The request is then addressed to the wild-carded PSI with a "handoff" parameter to indicate that the CS call is to be handed off to IMS. Example:

SIP:<CALL_REF_PSI>.operator.com;handoff

In this case, the SIP Request is routed directly to the CSI-AS 21 where the wild-carded PSI is managed. CSI-AS then keys on the CS call referenced by the wild-carded PSI and re-routes the request to the VCC AS (i.e., CCCF/NeDS) where the handoff procedure is executed. Note that the handoff can be initiated from a different device than the device hosting the CS call if both devices share the same registered TEL URL IMPU.

It should be noted that the preceding description of the SIP package included parameter names, e.g., callref, remote-party, handoff, etc. These names were provided for illustrative purposes only. Other names could be substituted provided that the meaning (i.e. the context within the SIP package) remains as set forth herein.

While particular embodiments have been shown and described, it will be apparent to those skilled in the art that changes and modifications may be made without departing from the principles set forth herein. The matter set forth in the foregoing description and accompanying drawings is offered by way of illustration only and not as a limitation.

The invention claimed is:

1. A method, comprising:
receiving a request in an IP telephony domain from a device to notify the device when a call is established in a CS domain with at least one other device;
creating a call context in the IP telephony domain about the call established in the CS domain;
sending a notification, based on the call context, in the IP telephony domain to the device when the call is established in the CS domain; and
initiating an IP session in the IP telephony domain between the device and the at least one other device in response to the notification.

2. The method of claim 1 further comprising:
detecting establishment of the call in the CS domain.

3. The method of claim 1 wherein the step of creating the call context comprises:
generating a call reference; and
storing the call reference in a memory component of the IP telephony domain.

4. The method of claim 3, further comprising:
sending the call reference to the device.

5. The method of claim 4, wherein the step of sending comprises:
sending a Short Messaging Service (SMS) message to the device that includes the call reference.

6. The method of claim 4 further comprising:
sending a Session Initiation Protocol (SIP) NOTIFY message to the device that includes call reference.

7. A system, comprising:
an interface component that receives a subscription request in an IP telephony domain from a device to notify the device when a call is established in a CS domain with at least one other device;
a context creation component that creates a call context in the IP telephony domain about the call established in the CS domain; and
a notification component that notifies the device, in the IP telephony domain, about the call context when the call is established in the CS domain,
wherein the interface component initiates an IP session in the IP telephony domain between the device and the at least one other device in response to the notification of the notification component.

8. The system of claim 7, wherein the context creation component further comprises:
a call reference generation component that generates a call reference for the call, wherein the system further comprises a memory component to store the call reference.

9. The system of claim 8 further comprises:
a call reference communication component that sends the call reference to the device in the IP telephony domain.

10. The system of claim 8, wherein the call reference communication component comprises:
a processing component that sends a Short Message Service (SMS) message to the device that includes the call reference.

11. The system of claim 8, wherein the call reference communication component comprises:
a session initiation protocol (SIP) component that sends a SIP NOTIFY message to the device that includes the call reference.

* * * * *